(12) United States Patent
Nelson

(10) Patent No.: US 6,868,145 B1
(45) Date of Patent: Mar. 15, 2005

(54) ALPHANUMERIC KEYBOARD WITH TELEPHONE DIALING CAPABILITY

(75) Inventor: Avi Nelson, North Reading, MA (US)

(73) Assignee: Vertizon Corporation, North Reading, MA (US)

( * ) Notice: Subject to any disclaimer, the term of this patent is extended or adjusted under 35 U.S.C. 154(b) by 504 days.

(21) Appl. No.: 09/694,975

(22) Filed: Oct. 24, 2000

(51) Int. Cl.$^7$ .............................................. H04M 11/00
(52) U.S. Cl. ................................. 379/93.09; 379/93.05
(58) Field of Search ....................... 379/216.01, 355.01, 379/357.01, 359, 362, 368, 369, 433.06, 433.07, 355.1, 93.09, 93.15, 93.05, 353

(56) References Cited

U.S. PATENT DOCUMENTS

| | | | | |
|---|---|---|---|---|
| 4,503,288 A | * | 3/1985 | Kessler | 379/88.16 |
| 4,860,342 A | | 8/1989 | Danner | 379/96 |
| 4,980,910 A | | 12/1990 | Oba et al. | 379/355 |
| 5,375,165 A | | 12/1994 | Haber et al. | 379/90 |
| 5,572,572 A | | 11/1996 | Kawan et al. | 379/98 |
| 5,581,593 A | | 12/1996 | Engelke et al. | 379/52 |
| 5,671,268 A | * | 9/1997 | Flipeaux | 379/68 |
| 5,815,153 A | | 9/1998 | Isensee et al. | 345/354 |
| 5,901,217 A | | 5/1999 | Kanbar | 379/355 |

* cited by examiner

*Primary Examiner*—Curtis Kuntz
*Assistant Examiner*—Alexander Jamal
(74) *Attorney, Agent, or Firm*—Weingarten, Schurgin, Gagnebin & Lebovici LLP

(57) ABSTRACT

An alphanumeric keyboard connects to a telephone line and is operable in two operating modes. The keyboard is in a first operating mode when the telephone is in an "off-hook" condition and no connection on the telephone line has been established. In the first operating mode, the keyboard generates telephone number dialing signals on the telephone line as corresponding alphanumeric keys of the keyboard are pressed. Thus for example as a user enters the letters D-O-G by pressing the corresponding single-letter keys of the keyboard, the signaling tones for the digits 3, 6 and 4 are generated on the telephone line. In an enhanced version, the keyboard assigns distinct signal tones, such as an expanded dual tone multi-frequency (DTMF) set, to each alphanumeric character, thereby significantly increasing the quantity of potential telephone numbers. The keyboard operates in a second operating mode when the telephone is in an off-hook condition and a connection on the telephone line has been established. In this mode, the keyboard generates alphanumeric character code signals such as ASCII code signals on the telephone line as corresponding keys of the keyboard are pressed. This feature enables cooperating equipment on the other end of the line to receive text messages and other data from the keyboard after a connection has been established. An enhanced version of the keyboard has a processor, memory and a display to permit a variety of additional features to be realized, such as electronic mail messaging.

27 Claims, 1 Drawing Sheet

ALPHANUMERIC KEYBOARD WITH TELEPHONE DIALING CAPABILITY

CROSS REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention is related to the field of data and telephony communication devices.

A conventional telephone includes a keypad having ten numeric keys, each of which generates a corresponding set of tones on a telephone line to signal a corresponding decimal digit of a telephone number when pressed. This arrangement works well for telephone numbers that are expressed as strings of decimal digits. However, there has been increasing use of what can be referred to as "mnemonic" telephone numbers, i.e., telephone numbers that are expressed as strings of letters alone or letters mixed with decimal digits. For example, telephone numbers of this type are used in nationwide toll-free calling plans employing special area codes such as "800". Many businesses purchase toll-free numbers that can be expressed using a word or phrase associated with the business or its goods or services, in order to make it easier for customers to contact the business.

The conventional telephone keypad allows for use of such mnemonic telephone numbers by simply assigning groups of three letters to each digit. Thus, the letters "A", "B", and "C" are assigned to the digit "2", etc. There is no special functionality in the telephone. Rather, the letters are merely printed on each digit key. However, this set of letter-to-digit assignments is not easily remembered. A user dialing a mnemonic telephone number generally must scan the keypad multiple times during dialing, in order to find the correct key to press for each letter of the mnemonic telephone number. This process is inefficient and error-prone. It would be desirable to provide for a more efficient and error-free way of dialing mnemonic telephone numbers.

BRIEF SUMMARY OF THE INVENTION

In accordance with the present invention, an alphanumeric keyboard is disclosed that provides for direct entry of a mnemonic or letter-based telephone number by a user. The keyboard provides a translation between each of the 26 letter keys and the set of signals for the corresponding decimal digit. Because the user is thus freed of the task of finding the correct digit key to press, dialing efficiency and accuracy are improved.

During operation, the disclosed keyboard is connected to a telephone line and may function in either of two operating modes. In a first operating mode, the keyboard generates telephone number dialing signals (i.e., pulse signals or dual-tone multi-frequency (DTMF) signaling tones) on the telephone line as corresponding alphanumeric keys of the keyboard are pressed. Thus, as a user enters the letters D-O-G by pressing the corresponding single-letter keys of the keyboard, for example, the DTMF signaling tones for the digits 3, 6 and 4 respectively are generated on the telephone line. In an enhanced version, the keyboard assigns distinct signal tones, such as an expanded dual tone multi-frequency (DTMF) set, to each alphanumeric character. This significantly increases the quantity of potential telephone numbers a future telephone might access.

In a second operating mode, the keyboard generates alphanumeric character code signals, such as American Standard for Communications Interface Interchange (ASCII) code signals, on the telephone line as corresponding keys of the keyboard are pressed. This feature enables cooperating equipment on the other end of the line to receive text messages and other data from the keyboard after a connection has been established.

The selection of operating mode may be manual, such as by a user-operated switch, or may be automatic. When the keyboard is connected to the telephone line along with a conventional telephone, for example, the keyboard can select the first operating mode when the telephone is in an "off-hook" condition and no connection on the telephone line has been established. The second operating mode can be selected when the telephone is in an off-hook condition and a connection on the telephone line has been established.

The disclosed keyboard employs the same mapping of alphabet characters to dialing signals as used on conventional telephones, namely, the three-to-one mapping of (A, B, C) to "2", (D, E, F) to "3", etc. However, it is contemplated that the present invention can be used in future telephone systems having expanded dialing capacity. For example, each alphabet character may be associated with a different telephone number dialing signal, so that a much larger number of multi-character telephone numbers can be generated.

Other aspects, features, and advantages of the present invention are disclosed in the detailed description that follows.

DETAILED DESCRIPTION OF THE INVENTION

Figure 1:
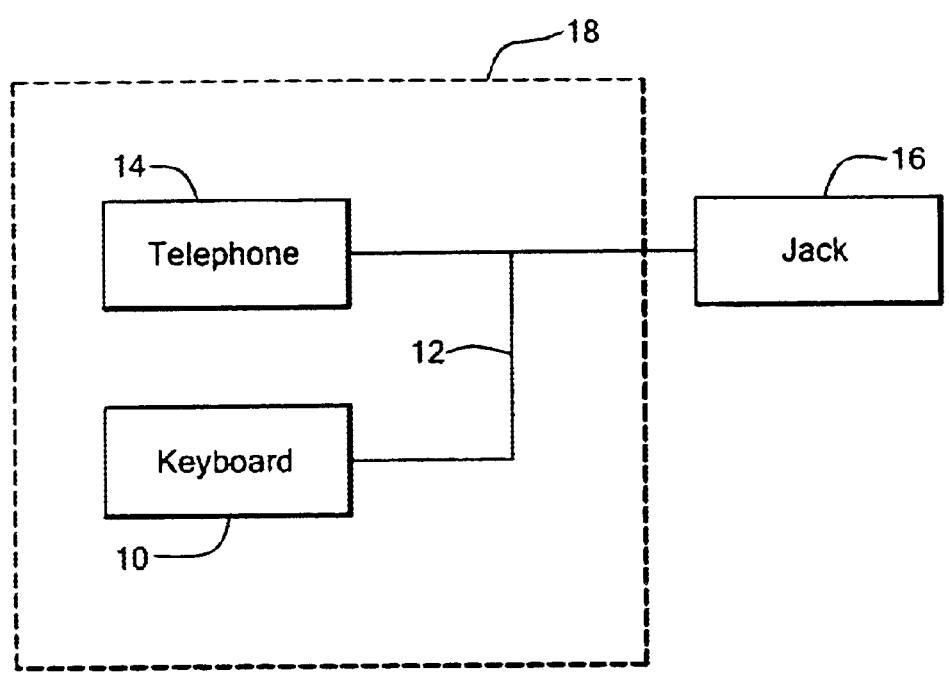
FIG. 1 is a block diagram of a telephone and keyboard arrangement in accordance with the present invention.

In FIG. 1, an alphanumeric keyboard 10 is connected to a telephone line 12 along with a telephone 14, and the telephone line 12 is connected to a telephone wall jack 16. The keyboard 10 may be of the general type commonly used with a personal computer. For example, the keyboard 10 may be similar to the 101-key keyboard commonly referred to as a "PS/2-compatible" keyboard, while also incorporating circuitry enabling it to perform the functions described below.

The keyboard 10 is usable in two different operating modes. The operating mode may be selected in response to a user indication, such as the setting of a switch (not shown). Alternatively, the keyboard 10 can automatically enter one of the two operating modes based on the status of the telephone line 12. In such a case, the first mode is operative when the telephone 14 is in an off-hook state (i.e., when the handset is off the cradle or the "speaker phone" operating mode is active), but no connection has been established on the telephone line 12. The second mode is operative when the telephone 14 is in an off-hook state and a connection has been established on the telephone line 12.

In the first operating mode, the keyboard 10 generates signaling tones or pulses on the telephone line 12 as a user presses keys corresponding to the digits of a telephone number, in a manner analogous to conventional "touch tone" telephones. The keys used in this mode may be the numeric keys at the top of the keyboard, the numeric keys arrayed in adding-machine style at one side of the keyboard, or some other set of keys that have been designated for such use. Additionally, the letter keys may also be used to dial telephone numbers that are expressed mnemonically, such as 800 numbers. Sets of letters are associated with the digits "2" through "9" as on a telephone keypad, i.e., the letters "A", "B", and "C" are associated with the digit "2", the letters "DD", "E", and "F" are associated with the digit "3", etc. Thus when the letter keys D-O-G are pressed, for example, signaling tones are generated for the digits 3, 6 and 4, respectively. Apart from the number and letter keys, the "*" and "#" keys on the keyboard 10 can also be used to generate their counterpart telephone dialing signal tones, as with a conventional telephone keypad. Thus, in the first operating mode the disclosed keyboard can function as a self-contained alternate dialing means to the keypad on a conventional telephone. The keyboard 10 may be connected in parallel with the telephone 14 so that either the keyboard 10 or the conventional keypad on the telephone 14 may be used as a means for generating dialing signals.

In the second operating mode, the keyboard 10 includes the function commonly associated with a data modem, that is, generating tone patterns that represent codes (such as ASCII codes) for alphanumeric and other characters. These codes are generated on the telephone line 12 when corresponding keys on the keyboard are pressed. Thus for example, the ASCII code for the =4 letter 't' is generated when the "T" key is pressed and both the "shift" and "shift lock" keys are not active. Similarly, the code for the character "*" is generated when the number "8" is pressed and either the "shift" or "shift lock" key is active. These codes can be received and interpreted by cooperating equipment at the other end of the connection, such as a computer connected to the telephone system by a modem.

Although the above-described operation provides compatibility with existing telephone equipment, a slightly different embodiment may be used with future telephone systems having more than ten or twelve distinct dialing signals. For example, a future telephone system may employ a sufficient number of distinct dialing signals to enable each alphabet character as well as each decimal digit to be uniquely represented. In such a system, the keyboard 10 preferably generates a distinct dialing signal for each different character key and each different number key. These dialing signals may be part of an expanded multi-frequency tone set, with sufficient distinct tone patterns to represent all the desired characters and numbers. Such a tone set may be an expansion of the DTMF system currently in wide use in conventional telephone systems. Alternatively, the dialing signals may consist of coded pulses or other signaling elements.

The keyboard 10 may be equipped with processing, storage and display capabilities (not shown), and/or may be capable of receiving coded information via the telephone line 12 as well as sending it as described above. Such an enhanced version of the keyboard 10 can be used in a variety of different ways. For example, a user may enter a message into memory using the alphanumeric keys, while viewing the message being entered on the display. The user can then instruct the keyboard 10 to send the entire message on the telephone line 12 when a subsequent connection is made. Such functionality can form part of an electronic mail system, for example. The display can also be used to display the digits of telephone numbers as they are dialed, in a manner similar to many conventional office telephones.

Additionally, such an enhanced version of the keyboard 10 can also include call-answering and caller identification (ID) functionality. The keyboard 10 may accept messages from only particular callers, and provide the messages and the respective identities of the callers to a user upon request. Additionally, messages can be pre-recorded by a user and then transmitted to particular callers. Records of received and transmitted messages, callers, and other information such as time of call, etc, can be kept and provided to the user upon request.

An enhanced version of the keyboard 10 may also conveniently include an interface to a printer for generating hard copy of desired information, such as received messages, etc. Additionally, when the telephone 14 is in an on-hook state, the user can enter telephone numbers, names, and other information via the keyboard for storage in non-volatile memory. These telephone numbers can then be retrieved and dialed automatically in response, for example, to the user's pressing a "dial" command key.

In the illustrated embodiment, the keyboard 10 is separate from the telephone 14, and thus may be transported and used with other telephones. It may be desirable in an alternative embodiment to include the keyboard 10 and telephone 14 in the same physical package, as indicated by dotted lines 18 in FIG. 1. In general, the alphanumeric keyboard is a keyboard containing numbers and letters and/or other symbols commonly found on a typewriter or computer keyboard.

It will be apparent to those skilled in the art that other modifications to and variations of the above-described technique are possible without departing from the inventive concepts disclosed herein. Accordingly, the invention should be viewed as extending to the full scope and spirit of the appended claims.

What is claimed is:

1. An alphanumeric keyboard comprising:

control circuity connectable to a telephone line; and a plurality of keys electrically coupled with said control circuity, each key being uniquely associated with an alphanumeric character from a set of alphanumeric characters including at least a plurality of letter characters, each alphanumeric character being representable as data by an alphanumeric code signal from a set of alphanumeric code signals, each alphanumeric character also being representable as a component of a telephone number by a telephone number dialing signal from a set of telephone number dialing signals in accordance with a mapping, the control circuitry being operative in response to the pressing of a key for a given alphanumeric character (1) in a first operating mode, to generate the alphanumeric code signal to which the given alphanumeric character is mapped, and (2) in a second operating mode, to generate the telephone number dialing signal to which the given alphanumeric character is mapped;

said control circuitry being operative detect the presence or absence of an off hook condition and a call connection involving a telephone device coupled to said telephone line and to automatically enter the second operating mode when said telephone device connected to said telephone line is in an off-hook condition and no connection on the telephone line has been established, and the control circuitry is operative to automatically enter the first operating mode when the local telephone device is in an off-hook condition and a connection on the telephone line has been established.

2. An alphanumeric keyboard according to claim 1 further including said telephone and a housing, wherein said housing contains said telephone and said alphanumeric keyboard.

3. An alphanumeric keyboard according to claim 1, wherein the alphanumeric character code signals represent American Standard for Communications Information Interchange (ASCII) character codes.

4. An alphanumeric keyboard according to claim 1, including a display.

5. An alphanumeric keyboard according to claim 4, wherein the display is operative to display digits corresponding to the telephone number dialing signals as they are generated on the telephone line.

6. An alphanumeric keyboard according to claim 4, wherein the display is operative to display alphanumeric characters corresponding to alphanumeric character code signals generated on the telephone line.

7. An alphanumeric keyboard according to claim 1, including a display, memory, and processing logic.

8. An alphanumeric keyboard according to claim 7, further operable in a third operating mode, the keyboard being operative in the third operating mode to (i) accept a message entered by a user via the keys of the keyboard and (ii) store the entered message in the memory, and wherein the keyboard is further operative in the first operating mode to generate on the telephone line a sequence of alphanumeric character code signals representing the stored message.

9. An alphanumeric keyboard according to claim 8, wherein the keyboard is operative to automatically enter the third operating mode when the local telephone device is in an on-hook condition.

10. An alphanumeric keyboard according to claim 7, being further operative in the first operating mode to (i) answer an incoming call on the telephone line, (ii) identify the caller who has placed the incoming call, and (iii) generate on the telephone line a sequence of alphanumeric character code signals representing a message previously stored in the memory, if the caller is identified as an intended recipient of the message.

11. An alphanumeric keyboard according to claim 10, being further operative to maintain a record of the incoming call and to provide the record to a user upon request.

12. An alphanumeric keyboard according to claim 7, including an interface to a printer.

13. An alphanumeric keyboard according to claim 7, being further operative to accept and store a user-entered telephone number in the memory, and being operative in the second operating mode to generate on the telephone line, upon a command from the user, a sequence of telephone number dialing signals corresponding to the stored telephone number.

14. An alphanumeric keyboard according to claim 7, being further operative to (i) receive a message from the telephone line, (ii) store the received message in the memory, and (iii) display the stored message to a user upon request.

15. An alphanumeric keyboard according to claim 1, wherein the telephone number dialing signals are dual-tone multi-frequency signals.

16. An alphanumeric keyboard according to claim 1, wherein the telephone number dialing signals are pulse signals.

17. An alphanumeric keyboard according to claim 1, wherein (i) the telephone number dialing signals are associated with respective decimal digits, (ii) certain ones of the telephone number dialing signals are further associated with respective sets of letter characters, and (iii) each telephone number dialing signal is generated in response to the pressing of the key for the associated decimal digit and in response to the pressing of the key for each letter character in the associated set of letter characters.

18. An alphanumeric keyboard according to claim 1, wherein (i) certain ones of the telephone number dialing signals are associated with respective decimal digits, (ii) certain other ones of the telephone number dialing signals are associated with respective letter characters, and (iii) each telephone number dialing signal is generated in response to the pressing of the key for the associated decimal digit or letter character.

19. An alphanumeric keyboard according to claim 18, wherein the telephone number dialing signals are associated with a multi-frequency tone set.

20. An alphanumeric keyboard according to claim 19, wherein the telephone number dialing signals are associated with a dual tone multi-frequency tone set.

21. An alphanumeric keyboard according to claim 1, wherein the set of alphanumeric characters comprises substantially all the letters of the English alphabet.

22. An alphanumeric keyboard according to claim 21, wherein the set of alphanumeric characters additionally comprises substantially all the decimal digits.

23. An alphanumeric keyboard according to claim 22, wherein the keys are arranged in substantially the conventional QWERTY format.

24. An alphanumeric keyboard according to claim 1, wherein the mapping is a standard mapping.

25. An alphanumeric keyboard according to claim 24, wherein the standard mapping comprises the conventional mapping of the letters A, B and C to the telephone number dialing signal #2, the letters D, E and F to the telephone number dialing signal #3, the letters G, H and I to the telephone number dialing signal #4, the letters J, K and L to the telephone number dialing signal #5, the letters M, N and O to the telephone number dialing signal #6, the letters P, R and S to the telephone number dialing signal #7, the letters T, U and V to the telephone number dialing signal #8, the letters W, X and Y to the telephone number dialing signal #9, and the letters Q and Z to the telephone number dialing signal #0.

26. The alphanumeric keyboard according to claim 1 wherein each telephone number dialing signal generated in response to the activation of each of said first and second pluralities of keys comprises a unique dialing signal.

27. The alphanumeric keyboard according to claim 26 wherein each dialing signal comprises a tone having multiple frequencies.

* * * * *

UNITED STATES PATENT AND TRADEMARK OFFICE
CERTIFICATE OF CORRECTION

PATENT NO. : 6,868,145 B1
APPLICATION NO. : 09/694975
DATED : March 15, 2005
INVENTOR(S) : Avi Nelson It is certified that error appears in the above-identified patent and that said Letters Patent is hereby corrected as shown below:

Column 3, line 12, " "D" " should read --"D"--; and

Column 3, line 31, delete "=4".

Signed and Sealed this

First Day of August, 2006

JON W. DUDAS
*Director of the United States Patent and Trademark Office*